Aug. 11, 1959     J. W. MOBARRY     2,898,746
CONTROL MEANS FOR REFRIGERATION COMPRESSOR
Filed Oct. 19, 1956
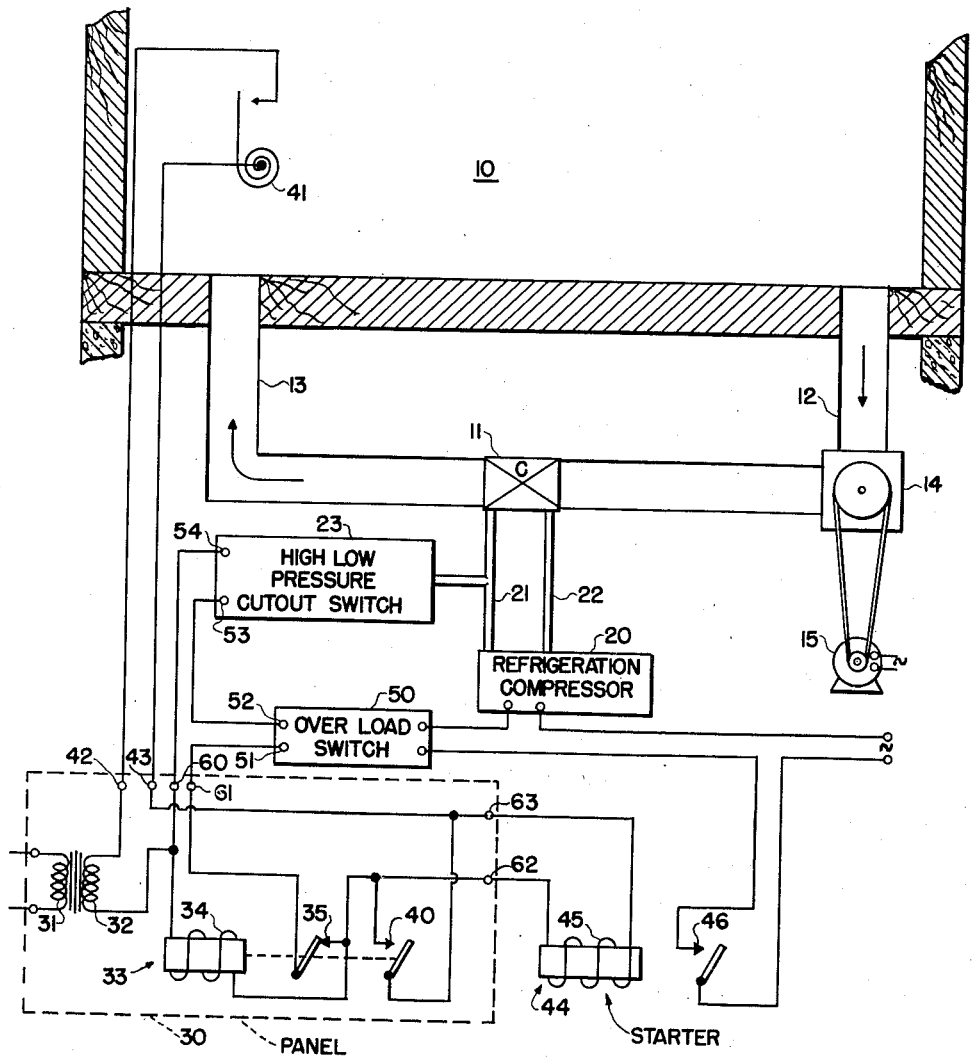
INVENTOR.
JOHN W. MOBARRY
BY
Joseph E Ryan
ATTORNEY United States Patent Office 2,898,746
Patented Aug. 11, 1959

2,898,746

CONTROL MEANS FOR REFRIGERATION COMPRESSOR

John W. Mobarry, Edina, Minn., assignor to Minneapolis-Honeywell Regulator Company, Minneapolis, Minn., a corporation of Delaware Application October 19, 1956, Serial No. 617,171

5 Claims. (Cl. 62—209)

The present invention is concerned with an improved motor control circuit, in particular, a circuit for providing positive shut down of the motor should certain conditions exist and the resetting or restoring of the circuit to normal operation being brought about by opening the main control circuit.

In motor control circuits especially, motors used to drive refrigeration apparatus of air conditioning installations, it is necessary to have a means of shutting down the motor should certain abnormal conditions come about, such as, excessive motor current or excessive or low pressures develop in the refrigeration apparatus. Once an abnormal condition takes place it is desired to keep the equipment and motor in a shut down or de-energized position until some act or change in the control circuit is brought about by the occupants of the dwelling. Once the system has gone out on the so-called safety or de-energized position the occupants are generally aware that something abnormal exists and some investigation will be made.

A common control circuit for accomplishing this motor protection is generally known as the "high impedance" circuit. A control relay has its energizing winding connected in series with the energization winding of the main controller or starter for the motor. The two relay windings are connected in a series circuit with a room temperature responsive switch to a source of power. The control relay has a normally de-energized contact which is connected in series with the abnormal condition responsive device such as the overload switches or the high low pressure cutout switches forming a shunting circuit around the energization winding of the control relay. During normal operation, the starter is energized through the shunt circuit including the overload switch and the high low pressure cutoff switch. Should an abnormal condition exist to open one of the switches the control relay is placed in the series circuit with the starter winding. Since the energization winding of the control relay has a high impedance, the current through the starter winding is limited to such an extent that the starter is de-energized and the motor shut down. In order to re-establish operation once the overload or high low pressure cutoff switches have returned to their normal closed position, it is necessary to break the main control circuit or open the thermostat. This de-energizes the control relay and its normally closed contact will again close the shunting circuit around its energization winding.

When a panel is made containing the control relay and terminals are provided for connecting a starter relay thereto, the control relay and the starter energization windings are not always matched so that the impedance of the circuit is sufficiently high to limit the current to an extent needed to drop out the starter. This is especially so when the seller of the panel has no control over what type of starter is used. It is then possible when a starter is connected to a panel that the total impedance of the two energization windings is insufficient to reduce the currents, when the shunt circuit around the control relay energization winding is broken, to cause de-energization of the starter.

The present invention is an improvement over the prior art in that it adds another contact to the control relay which is normally open. This contact is placed across the energization winding of the starter so that once an abnormal condition exists and the shunt circuit is broken and the control relay is energized the starter winding is shunted and the starter is positively de-energized to shut the motor down.

It is therefore an object of the present invention to provide an improved motor control circuit.

It is another object of the present invention to provide in a motor protection circuit positive de-energization of the starter upon the occurrence of an abnormal condition even though the windings of the control relay and starter are not properly matched.

These and other objects will become apparent upon the study of the single figure disclosing the motor protection circuit for protecting the operation of a refrigeration compressor apparatus in an air conditioning system.

Referring to the single figure a space 10 is conditioned by the circulation of air through a cooling coil 11 connected in a duct system between a return air duct and a supply duct 12 and 13, respectively. The air is forced through the heat exchanger or coil 11 by a fan 14 driven by a conventional fan motor 15.

Refrigeration is circulated through coil 11 from a conventional refrigeration compressor 20 which is connected to the coil by conduits or pipes 21 and 22. Connected to the refrigeration apparatus is a high low pressure cutout switch 23 of a conventional type. Switch 23 opens the circuit connected thereto whenever the pressure of the refrigerant in the refrigeration compressor exceeds some predetermined value or drops below some predetermined value. Each of the aforementioned pressure conditions are generally accepted to be abnormal. The refrigeration compressor 20 is of a conventional type, the details of which are no part of this invention. A panel 30 comprises a transformer having a primary 31 and a secondary 32. The primary winding 31 is connected to a source of power. The panel also contains a control relay 33 having an energization winding 34 and two switches. Switch 35 is normally closed and switch 40 is normally open when the winding 34 of the relay is de-energized.

A thermostat or temperature responsive device 41 is responsive to the temperature in space 10. This thermostat opens and closes a switch associated therewith which is connected between terminals 42 and 43 of the panel. A controller or starter 44 has an energization winding 45 and a set of contacts 46 which are normally open when the winding 45 is de-energized. Starter 44 has its contacts 46 connected in the circuit which connects the refrigeration compressor to a source of power so that when the starter is energized the compressor is energized. In series with contacts 46 is an overload switch 50 which responds to the current in the circuit of the refrigeration compressor and when this current becomes excessive a circuit between terminals 51 and 52 of the overload switch is disconnected. It is thus seen that upon energization of starter 44 the refrigeration compressor is energized and as long as its input current is below some predetermined value the overload switch will maintain a closed circuit between terminals 51 and 52.

The overload switch and the high low pressure cutout switch, having its terminals 53 and 54 between which a circuit exists as long as the high or low pressure limits are not exceeded, are connected in series between terminals 60 and 61 of the panel. The circuit is traced as follows: from terminal 61 to terminal 51, from terminal 52 to terminal 53, and from terminal 54 to terminal 60. The energization winding 45 of the starter is connected between terminals 62 and 63 of the panel.

The internal wiring of the panel is such that a circuit exists between terminal 42 of the panel, secondary 32, terminal 60 of the panel, winding 34 and terminal 62 of the panel. Switch 35 is connected between terminals 61 and 62. Terminals 43 and 63 are interconnected. The contacts 40 are connected across terminals 62 and 63. Terminal 62 is connected to the extremity of the energization winding 34 opposite the secondary 32.

It is thus seen that when the starter is connected to the panel, it is always shunted by switch 40 when relay 33 is energized.

*Operation*

Referring to the single figure the panel is deenergized as thermostat 41 is open. Let us assume that there is a need for cooling and thermostat 41 closes to energize the starter 44 through a circuit traced from the thermostat, terminal 42, secondary 32, through the high low pressure cutout switch and the overload switch, switch 35, terminal 62, starter winding 45, terminal 63, terminal 43, and back to the thermostat. The thermostat could cycle on and off and the starter 44 would operate the refrigeration apparatus to maintain the coil temperature at some predetermined value.

Should an overload condition exist, that is, the current input to the refrigeration motor exceed some predetermined value, the switch of the overload switch would open to provide an open circuit between terminals 51 and 52. This would remove the shunt circuit from control relay 33 and place winding 34 in series with winding 45 of the starter.

As is the case in the prior art, the impedance of winding 34 would be so selected that the total impedance of the circuit would be high enough to cause the starter to be de-energized and it would drop out to open the contacts 46.

The present invention provides an additional switch 40 which shunt the winding 45 of the starter 44 when the control relay 33 is energized. This insures that the starter is de-energized and switch 46 is opened to de-energize the refrigeration compressor after the abnormal condition exists, such as the overload in this particular example. The refrigeration compressor 20 would then remain de-energized until the thermostat 41 was open and the circuit between terminals 42 and 43 opens to cause relay 33 to be de-energized. This would re-establish the shunt circuit around the relay, so that upon a subsequent closing of the thermostat 41, providing the overload switch 50 and the high low pressure cutout switch 23 were closed, winding 34 is not energized.

A supplier of a panel such as panel 30 with the improved control circuit need not match the relay windings of relay 33 and starter 44 as once relay 33 is energized its associated switch 40 would shunt the starter winding 44 to de-energize the starter and thus shut down the compressor. No matter what the size of the starter winding it will operate properly without being matched to the winding of the control relay 33. This is an improved advantage over the prior art in that it provides for the manufacture of a panel such as 30 which can be connected to any sort of starter 44 and still the motor protection is provided.

It is therefore believed that a novel and improved motor protection circuit has been set forth, however, the scope of the present invention should be only limited by the appended claims of which I claim:

1. A control circuit for controlling the operation of an electric motor driving a refrigeration compressor in an air coniditoning installation, a source of power, first relay means having an energization winding and two associated switches controlled thereby, a first of said switches being closed when said winding is energized and a second of said switches being opened when said winding is energized, second relay means having an energization winding and a switch controlled thereby, said last mentioned switch being closed when said energization winding of said second relay means is energized, temperature responsive switch means responsive to the temperature in a space to be conditioned, first circuit means connecting said temperature responsive switch means, said energization winding of said second relay means, and said energization winding of said first relay means in a series circuit to said source of power, a plurality of safety switches responsive to abnormal operating conditions of said refrigeration compressor and its associated motor, said safety switches being opened when said abnormal conditions exist, second circuit means connecting said safety switches and said second switch of said first relay means in a series circuit shunting said energization winding of said first relay means, and third circuit means connecting said first switch of said first relay means in parallel with said energization winding of said second relay means so that upon the energization of said first relay means said energization circuit of said second relay means is taken out of the circuit formed by said first circuit means.

2. A control circuit for controlling the supply of electric power to a motor, a source of power, first relay means having an energizing circuit and circuit closing means and circuit opening means operated thereby, second relay means having an energizing circuit and circuit closing means for controlling the supply of power to the motor, switch means, first circuit means connecting said switch means and said energizing circuits of said first and second relay means in a series circuit to said source of power, second switch means adapted to be opened upon the occurrence of an abnormal condition existing in the operation of the motor, second circuit means connecting said second switch means and said circuit opening means in series across said energizing circuit of said first relay means, third circuit means connecting said circuit closing means of said first relay means in parallel with said energizing circuit of said second relay means so that when said second switch means opens to place said energizing circuit of said first relay means in said series circuit the current is reduced to de-energize said first relay and said second relay means is de-energized.

3. In a control circuit for controlling an electric motor, a source of power, first switching means having an energization means, a circuit closing means, and circuit opening means so that upon power being supplied to said energization means each of said circuit means are operated, second switching means having an energization means, said switching means being adapted to control the operation of the motor whenever said energization means associated therewith is supplied with power, circuit means connecting said energization means of said first and second switching means in series to said source of power, circuit interrupting means, second circuit means connecting said circuit opening means and said circuit interrupting means in series shunting said energization means of said first switching means, third circuit means connecting said circuit closing means in parallel with said energization means of said second switch means thereby upon a circuit interruption by said circuit interrupting means said second switch means is de-energized and even upon a subsequent closing of said interrupting means said first switch means will remain energized until said first circuit means is broken.

4. A control circuit for an electric motor comprising, a source of electric power, first relay means having an energization winding and two associated switches, a first of said switches being normally closed and a second of said switches being normally open, an electric controller for controlling the operation of the motor, first circuit means connecting said energization winding and said controller to said source of power, circuit interrupting means, second circuit means connecting said circuit interrupting means and said first of said switches in a series circuit to shunt said energization winding, and third circuit means connecting said second of said switches set of contacts to shunt said controller so that upon said interrupting means opening said first relay means is energized and said controller is de-energized.

5. In a control panel for an electric motor, a transformer connected to a pair of terminals adapted to be connected to a source of power, said transformer having an output circuit, relay means having an energization winding and first and second associated switches operated thereby, said first switch being normally closed and said second switch being normally open when said relay is de-energized, a second pair of terminals adapted to be connected to a motor starter for initiating energization of the motor, a third pair of terminals adapted to be connected to a circuit closing device, circuit means connecting one of said second terminals, said energization winding, said output circuit of said transformer, and one of said third terminals in a series circuit, second circuit means connecting a second of said third terminals and a second of said second terminals, a fourth pair of terminals being adapted to be connected to safety switch apparatus providing an open circuit therebetween whenever an abnormal condition exists, circuit means connecting said energization means and said first switch in series between said fourth pair of terminals, and circuit means connecting said second switch between said second pair of terminals so that upon an abnormal condition existing said second pair of terminals are shorted out thus the motor starter associated therewith is inoperative.

References Cited in the file of this patent

UNITED STATES PATENTS 2,697,195     Courtney _____ Dec. 14, 1954